S. NOWLAN.
Coffee Roaster.
No. 38,977.
Patented June 23, 1863.
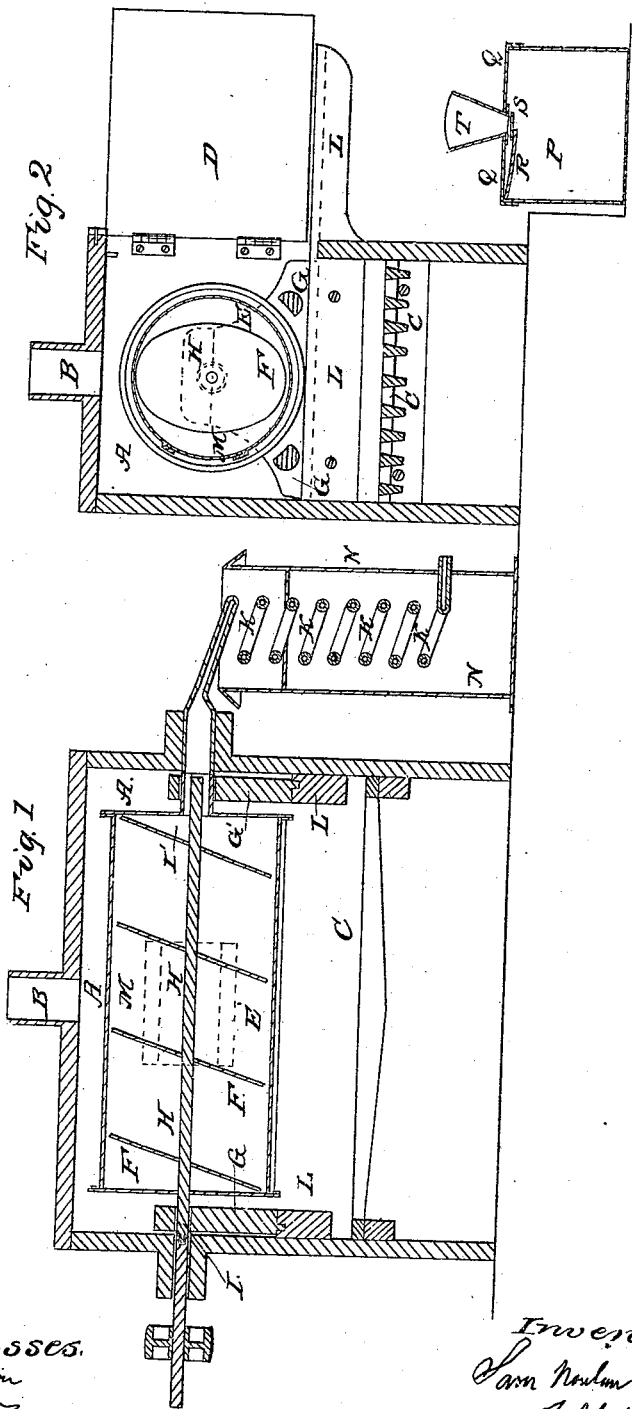

UNITED STATES PATENT OFFICE.

SAMUEL NOWLAN, OF NEW YORK, N. Y.

IMPROVEMENT IN COFFEE-ROASTING APPARATUS.

Specification forming part of Letters Patent No. 38,977, dated June 23, 1863; antedated November 12, 1862.

*To all whom it may concern:*

Be it known that I, SAMUEL NOWLAN, of the city of New York, in the county and State of New York, have invented certain new and useful Improvements in the Roasting of Coffee; and I hereby declare that the following, taken in connection with the accompanying drawing, is such a full, clear, and exact description of the same as to enable those skilled in the arts to make and use the same.

My invention consists, first, in the method herein described of collecting the volatile products of coffee and condensing the same, substantially in the manner and for the purpose hereinafter set forth; second, in combining with a revolving coffee-roaster of otherwise ordinary construction and operation a serpentine or other suitable condenser, in the manner hereinafter described, so that the vapors or volatilized essential oils shall pass into said condenser, there to be collected, as set forth.

From coffee, it is well known, while being roasted, exudes a large quantity of oily substances, which, first condensing upon the surface of the bean, are afterward, by the application of more heat, evaporated or volatilized. These volatile vapory products contain and carry off the greater part of the essence, the quantity and quality of which determine the value of the coffee. The roasting of coffee, therefore, as heretofore practiced, is extremely wasteful, as the greater portion of the essential oil which gives it the delicious flavor or aroma is lost. My invention is calculated to obviate this loss or waste, first, by collecting the volatile products in a separate vessel, where they are condensed for use as an essence of coffee; and, second, by collecting the roasted coffee in cases or boxes, from which no vapor or other products can escape.

In the accompanying drawing, A represents a coffee-roasting oven. It is here shown to consist of brick or other mason-work, and is generally used by large manufacturers. B is the chimney, and C the grate. The front and upper part of the oven is closed by means of doors D, made of sheet-iron or other fire-proof material. The coffee-roaster proper is a simple sheet-iron cylinder, E, hung upon a horizontal axle, H, which, by means of a tenon-and-mortise joint, I, is coupled with the outside shaft of the driving mechanism. The opposite end, I', of the axle is hollow, so that the volatile products may pass out from the roasting-cylinder into a serpentine tube, K, of the condenser. Both ends of the axle are supported by brackets G, that are capable of being slid in and upon ways L within and without the oven. The object of this arrangement is to enable the operator to conveniently remove the roaster from the oven for filling and emptying it through the gate or sliding register M for this purpose provided. The roaster is also provided with a series of dashers, F, which, being mounted upon the revolving shaft, will have a reciprocating motion imparted to them.

The condenser (shown in Figure 1) consists of a cylinder, N, which contains a serpentine tube, into which the volatile products penetrate. The cylinder N being filled with fresh water, a constant supply of which is steadily kept up to maintain the temperature, the volatile products will readily condense and issue at the lower end, at O, in oily drops, which are collected and may be sold and used as the concentrated essence of coffee. After the coffee is roasted, the cylinder is withdrawn from the oven upon the brackets L, and is turned upon its axis, so that the register-valve shall come underneath. At the moment the gate or valve is opened the coffee is allowed to drop out. I prefer to collect it in a box or case, P, constructed as follows: The box, which may be of any convenient form, is here shown to be quadrangular. Its cover Q has a large opening, which is provided with a funnel-shaped hopper, T, on the outside, and with a lid or valve, S, on the inside. This valve is actuated by a spring, R, to close the opening of the box, but the spring is so slight that the weight of the coffee in the hopper will cause its depression and allow the coffee to enter the box; but as soon as relieved of the weight the spring will immediately resume its normal position, and by means of the valve close the opening.

Having thus described my invention, I claim—

1. The method herein described of collecting the volatile products of coffee and condensing the same, substantially in the manner and for the purpose herein set forth.

2. Combining with a revolving coffee-roaster of otherwise ordinary construction and operation a serpentine or other suitable condenser, in the manner herein described, so that the vapors or volatilized essential oils shall pass into said condenser, to be collected, as set forth.

In testimony whereof I have signed my name to this specification before two subscribing witnesses.

SAMUEL NOWLAN.

Witnesses:
A. POLLAK,
EDM. F. BROWN.